United States Patent [19]

Petri et al.

[11] Patent Number: 5,003,785
[45] Date of Patent: Apr. 2, 1991

[54] AIR-CONDITIONING SYSTEM FOR A VEHICLE

[75] Inventors: Horst Petri, Weissach-Flacht; Michael Mönig, Hemmingen, both of Fed. Rep. of Germany

[73] Assignee: Dr. Ing h.c.F. Porsche Aktiengesellschaft, Fed. Rep. of Germany

[21] Appl. No.: 454,859

[22] Filed: Dec. 22, 1989

[30] Foreign Application Priority Data

Dec. 24, 1988 [DE] Fed. Rep. of Germany ....... 3843898

[51] Int. Cl.⁵ .................. F25B 49/00; B60H 1/32
[52] U.S. Cl. ........................ 62/131; 62/213; 62/244; 98/2.01; 236/91 F; 236/91 E
[58] Field of Search ................ 62/131, 133, 161, 163, 62/132, 213, 239, 244; 236/1 R, 91 C, 91 E, 91 F; 237/2 A; 165/25, 42, 43; 98/2.01

[56] References Cited

U.S. PATENT DOCUMENTS

| | | | |
|---|---|---|---|
| 4,035,796 | 7/1977 | Hedly et al. ........... | 236/1 R |
| 4,560,106 | 12/1985 | Dorsch ................ | 62/213 X |
| 4,685,616 | 8/1987 | Stein ................... | 237/2 A |

FOREIGN PATENT DOCUMENTS 0047210 3/1982 Japan ..................... 98/2.01

Primary Examiner—Harry B. Tanner
Attorney, Agent, or Firm—Evenson, Wands, Edwards, Lenahan & McKeown

[57] ABSTRACT

An air-conditioning system controls the temperature of the air flow such that a deviation of an interior temperature of the passenger compartment of the vehicle determined by an interior temperature sensor from a givable desired temperature becomes minimal (interior temperature control). In the case of vehicles with closable vehicle body openings, such as a convertible, a switching device is provided which detects the condition of the vehicle body opening and, when the vehicle is open, causes a switching-over of the air-conditioning system from interior temperature control mode to a blow-out temperature control mode.

10 Claims, 2 Drawing Sheets

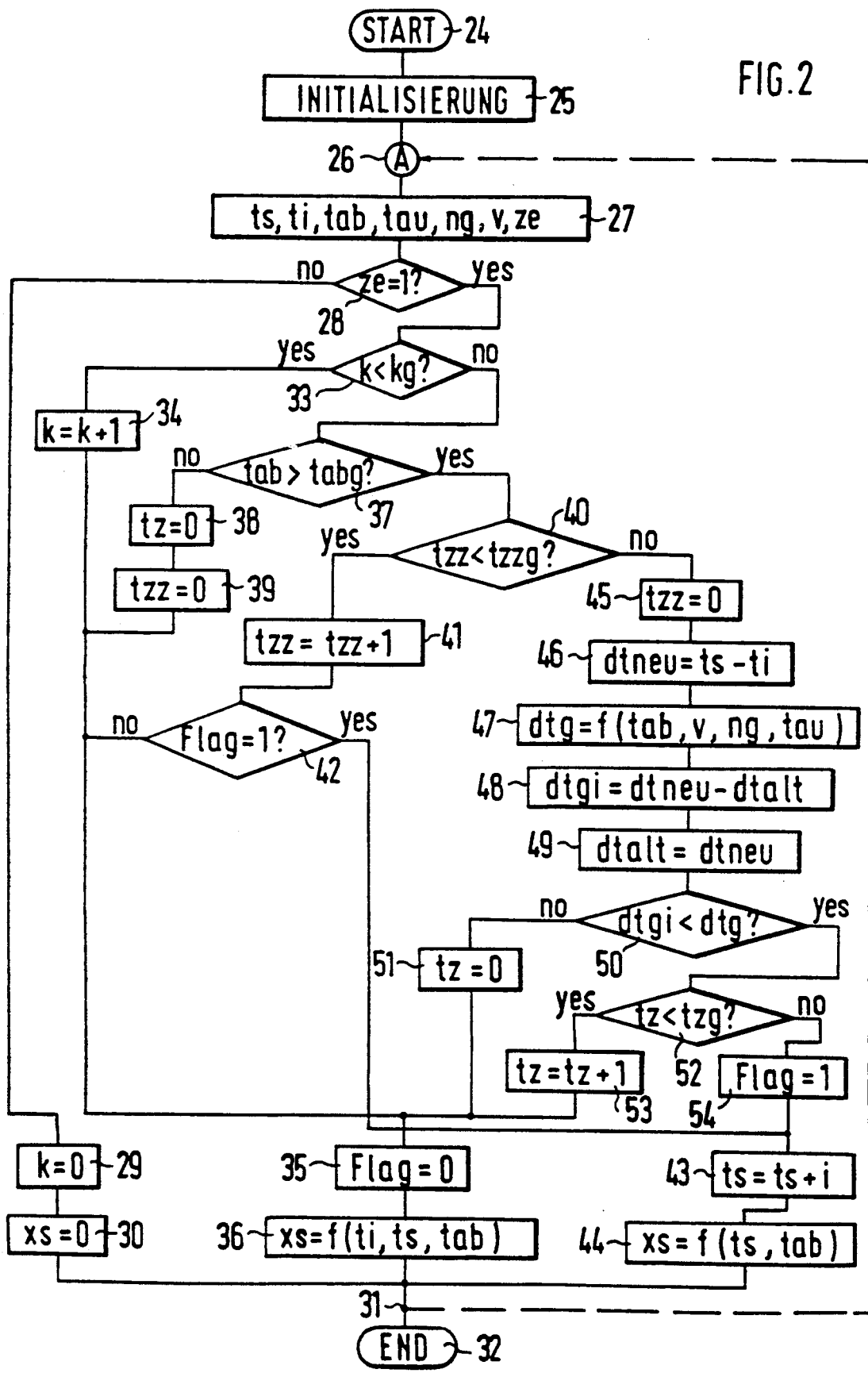

AIR-CONDITIONING SYSTEM FOR A VEHICLE

BACKGROUND AND SUMMARY OF THE INVENTION

The present invention generally relates to an air-conditioning system and more particularly to an air-conditioning system which avoids disturbances in operation which result from running an air-conditioning system when a passenger compartment of a vehicle is open to the atmosphere.

Vehicles are frequently equipped with an air-conditioning system which supplies an air current of a controllable temperature to a passenger compartment of the vehicle. The air-conditioning system controls the temperature of the air current, i.e. blow-out temperature, such that a deviation of an interior temperature of a passenger compartment of the vehicle determined by an interior temperature sensor from a given desired temperature becomes minimal, i.e. interior temperature control. This type of an air-conditioning system is part of an air-conditioning unit described in German Patent Specification (DE-P) 38 36 991.5.

In this case, the interior temperature sensor is frequently integrated in a control apparatus for the air-conditioning system which is arranged in a control panel of the vehicle. This interior temperature sensor is housed there in a small forced-ventilation duct which is open in the direction of the passenger compartment of the vehicle.

However, vehicles of this type, in addition to having a closed construction with a firm roof, are also built in an open or openable construction, i.e. convertible. When this type of a convertible vehicle is driven with an open roof, disturbances may occur in the air-conditioning system, such as excessive blow-out temperatures of the air flowing out of blow-out devices of the air-conditioning system into the passenger compartment of the vehicle, if the interior temperature sensor, as the result of unfavorable air flows or turbulences, is acted upon by cold ambient air.

It is therefore an object of the invention to provide an air-conditioning system of the initially mentioned type which avoids the mentioned disturbances when the vehicle is open.

The principal advantages provided by advantageous embodiments of the present invention include that, by means of simple measures, an effective air-conditioning system is provided for a vehicle with closable body openings which ensures the comfort in the passenger compartment of the vehicle when the vehicle body openings are closed as well as when they are open and particularly avoids an excessive blow-out temperature of the air flowing into the passenger compartment of the vehicle.

For this purpose, according to one embodiment of the present invention, a switching device is provided in the vehicle which detects a condition of an open vehicle body opening and, in this condition, causes a switching-over of the air-conditioning system from an interior temperature control mode to a blow-out temperature control mode. In this embodiment, the switching device is constructed as a switch which is to be operated manually or as a limit switch which is actuated by a component closing the vehicle body opening.

Since frequently another switching input cannot simply be added to (electronic) control apparatuses of air-conditioning systems of existing vehicles, it is also possible, according to a further embodiment of the invention, to implement the switching device as a software or firmware module. This arrangement detects the condition of the opened or closed vehicle from sensor signals by determining, from the blow-out temperature and at least the rotational speed stage of a blow-out fan of the air-conditioning system or the vehicle speed or the outside temperature, a limit value for a time variation of a temperature deviation of an interior temperature (ti) from a desired temperature (ts) (minimum desired variation) and comparing this limit value with a time variation of the temperature deviation of the interior temperature from the desired temperature. When there is a variation of a shorter duration than the minimum desired variation, the air-conditioning system is switched from the interior temperature control mode to the blow-out temperature control mode.

Preferably, the comparison takes place only at blow-out temperatures which are in higher temperature ranges. The switching between the two control modes will be caused only if the time variation of the temperature deviation is less than the minimum desired variation for at least a given time period. In this embodiment, when the blow-out temperature is controlled, a desired value for the blow-out temperature is virtually increased by a fixed amount.

According to yet another embodiment of the invention, it is also conceivable to monitor the interior temperature measured by the interior temperature sensor with respect to its time variation and to switch the air-conditioning system from the interior temperature control mode to the blow-out temperature control mode, if the measured interior temperature is subjected to strong time fluctuations. In this case, the switching over should again take place only at a blow-out temperature in a higher temperature range and only if the strong time fluctuations of the measured interior temperature occur for at least a given time period.

Other objects, advantages and novel features of the present invention will become apparent from the following detailed description of the invention when considered in conjunction with the accompanying drawings.

BRIEF DESCRIPTION OF THE DRAWINGS

FIG. 2 is a flow chart of a control sequence of an air-conditioning system according to a further embodiment of the invention.

DETAILED DESCRIPTION OF THE DRAWINGS

Figure 1:
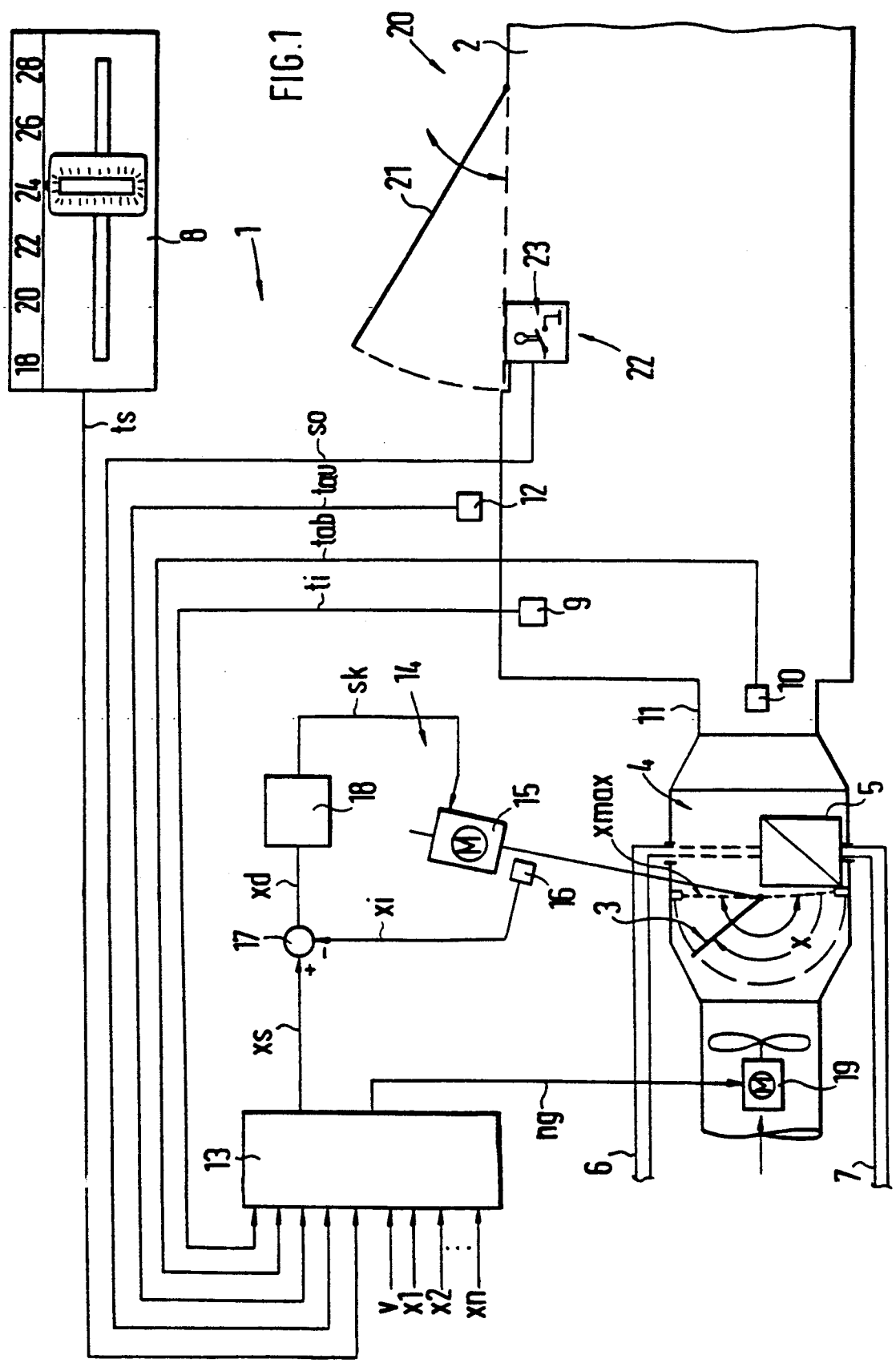
FIG. 1 is a block diagram of an air-conditioning system according to one embodiment of the invention.

In the following, the invention is explained by means of the embodiments shown in the drawings.

In FIG. 1, reference number 1 generally indicates a vehicle air-conditioning system with an automatic temperature control by means of, for example, a heater controlled on the air side. In this arrangement, the heating of a passenger compartment 2 is influenced by a temperature mixing flap 3 which functions as a control element which, in a temperature mixing chamber 4, guides the air flow supplied to the passenger compartment 2 either completely or partially through a heat exchanger 5 or guides it partially or completely past this heat exchanger 5. In this arrangement, the heat exchanger 5 is acted upon by a heat carrier medium by way of, for example, a feed line 6 and a return line 7.

By means of a desired-value indicating unit 8, a desired temperature (ts) may be set for an interior temperature (ti). From this desired temperature (ts) and the interior temperature (ti) in the passenger compartment 2, which is sensed by a temperature sensor 9, and a blow-out temperature (tab) determined by means of a blow-out temperature sensor 10 in a blow-out duct 11 and possibly other input signals (x1), (x2), ..., (xn) as well as, for example, the outside temperature (tau), etc. measured by an outside temperature sensor 12, a control apparatus 13, which includes, for example, a microcomputer, determines a desired position (xs) of the control element, i.e. temperature mixing flap 3.

A position control circuit generally indicated at 14 and having a motor operator 15 adjusts position (x) of the temperature mixing flap 3 corresponding to the desired position (xs). For this purpose, the actual position (xi) of the temperature mixing flap 3 is detected by a position detector 16. A comparator 17 compares the desired position (xs) and the actual position (xi) to determine a control difference $(xd)=(xs)-(xi)$. From the control difference (xd), the control circuit 14 including an electronic control system 18, generates a control signal (sk) for a motor operator 15.

This position control circuit 14 may naturally also be integrated into the control apparatus 13. In case of such integration, the control apparatus 13 is then also acted upon by the actual position (xi) and, in turn, then generates the control signal (sk) directly. The air-conditioning system 1 also comprises a rotational-speed-controllable ventilator or fan 19 which subjects the passenger compartment to forced flow ventilation and is controlled by the control apparatus 13 as a function of a given rotational-speed stage value (ng).

According to one embodiment of the present invention, a position of a closable vehicle body opening 20, such as a top 21 of a convertible, is equipped with a switching device, for example, limit switch 23, which detects either a closed position or a completely opened position of the top 20 and correspondingly emits a switching signal to the control apparatus 13. Naturally, an existing limit switch of an electric convertible control system may also be used for this purpose. However, it may also be a manually operable switch which is housed in a control panel of the vehicle and is operated by an operator when the vehicle is open.

As a result of this switching signal, the control apparatus 13 changes its control mode from an interior temperature control mode wherein xs=f(ti, ts, tab), i.e., the desired position (xs) of the temperature mixing flap is determined as a function of the interior temperature (ti) and the desired temperature ts (and blow-out temperature (tab)), to a blow-out temperature control mode wherein xs=f(ts, tab); i.e., the desired position (xs) is determined as a function of the desired temperature (xs) and the blow-out temperature (tb) alone. For this purpose, it may be useful to increase the desired temperature (ts) of the desired-value indicating unit 8 in the control apparatus by a certain temperature increment (i).

Naturally, the air-conditioning arrangement shown here may also be used in heaters controlled on the water side. However, a preferred application are heating systems controlled on the air side in which the energy required for heating is taken from the exhaust gas of, for example, an internal combustion engine, which is air-cooled. The forward flow 6 will then correspond to an exhaust pipe of the internal combustion engine, the return flow 7 is absent and an outlet of the exhaust gas heat carrier medium from the heat exchanger 5 ends in the exhaust system or in the open air.

If, on the other hand, an existing air-conditioning system, whose control apparatus 13 cannot easily be expanded by an additional switching input, is to be expanded by a switching device according to the present invention, in which case, it is assumed here that the control apparatus already has inputs for a vehicle speed (v) of a not shown vehicle speedometer and/or for the outside temperature (tau), the switching device can also be implemented by a control program for a microcomputer of the control apparatus 13. This is shown by the flow chart 2 of FIG. 2.

If this is an independent program for the temperature control, a computer initialization step 25 takes place after a program start step 24. However, this initialization step 25 is not necessary if the program is included as a subroutine in a main program of an air-conditioning system, for example, according to German Patent Specification (DE-P) 38 36 991.

After the passing of a reference mark A, at step 26, measuring values are determined for the desired temperature (ts), the interior temperature (ti), the blow-out temperature (tab), possibly also of the outside temperature (tau), of the rotational-speed step (ng) of the ventilator 19 and of the vehicle speed (v). An ignition signal (ze) of an internal combustion engine is also detected at step 27. It is queried whether the ignition signal (ze) is present at step 28 and if the answer is no, a counting quantity (k) is set to zero at step 29, and the desired position xs=0 is generated at step 30. A return takes place by way of branching point 31 to mark A of step 26, (independent program shown by an interrupted line) or a continuation takes place to the program end at step 32 (subroutine).

If the query at step 28 is positive, it is examined in step 33, whether a count (k) of the counter has not yet reached a limit value (kg). This counter is used for the monitoring of a cold-starting operation, during which the interior temperature control may be maintained (optional). If the k<kg condition of step 33 is met, the counter (k) is incremented at step 34 and a flag is set to zero at step 35. The temperature control mode at step 36 is determined as it is used, for example, in Porsche model 964, and the program is continued to the branching point 31.

If the query at step 33 is negative, it is examined in step 37 whether the blow-out temperature (tab) is larger than a limit value (tabg). If the answer is no, a counting quantity (tz) (first time counter, for determining the time during which the switching-over is suppressed) and a counting quantity (tzz) (measuring time) are set to zero at steps 38 and 39, respectively, and the program is continued with program step 35.

If the query at step 37 is positive, it is examined whether the counting quantity (tzz) is still smaller than a limit value (tzzg) (measuring time not yet reached) at step 40. If the answer is yes, the counting quantity (tzz) is incremented at step 41, and it is queried whether the flag is set at step 42. If the flag is not set, the program is continued to step 35. However, if the flag is set, the desired temperature (ts) is increased by an increment (i) (for example, by 2 degrees C.) at step 43; the desired value (xs) is generated at step 44, corresponding to a control mode for the blow-out temperature control, as is also implemented in the case of the above-mentioned vehicle when the interior temperature sensor fails; and the program is continued to branching point 31.

If the query at step 40 is negative, the counting quantity (tzz) is set to zero at step 45, and a temperature difference (dtneu) is determined from the desired temperature (ts) and the interior temperature (ti) at step 46. A limit value is determined for the time variation of the temperature deviation of the interior temperature (ti) from the desired temperature (ts) on the basis of the blow-out temperature (tab), the driving speed (v), the fan stage (ng) as well as, possibly, in addition, the outside temperature (tau), (minimum desired variation (dtg)=f(tab, v, ng, tau) at step 47. The time variation of the temperature deviation (dtgi) of the interior temperature (ti) from the desired temperature (ts) is determined at step 48, by comparing the temperature difference (dtneu) with a temperature difference (dtalt) determined in the preceding computing operation. Subsequently, the temperature difference (dtalt) is set to the newly computed value (dtneu) at step 49.

It is queried at step 50, whether the time variation of the temperature deviation (dtgi) is smaller than the minimum desired variation (dtg). If the answer is no, (tz) is set to zero at step 51, and the flag is set to zero at step 35; and the program is continued with program step 36 (top closed, interior temperature control mode). If query at step 50 is positive, it is examined whether counting quantity (tz) is smaller than a limit value (tzg) at step 52. If the answer is yes, the counting quantity (tz) is incremented at step 53, and the program is continued with program step 35. However, if the answer is no (time variation of the temperature deviation (dtgi) falls below minimum desired variation over the given time period), the flag is set to 1 at step 54, and the program is continued with program step 43 (top open, blow-out temperature control mode).

The minimum desired variation (dtg)=f(tab, v, ng, tau) at step 47, is preferably determined experimentally or from physical characteristics of the motor vehicle for the different parameters (tab), (v), (ng),(tau), and is stored as a value table (characteristic diagram) in a memory area of the control apparatus. From this diagram or from a mathematical description of the functional interrelationship, the minimum desired variation (dtg) can then be determined for a momentary combination of values of the parameters (tab), (v), (ng), (tau).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An air-conditioning system for a vehicle having closable vehicle body openings, a passenger compartment of the vehicle being heatable by an air flow of a controllable temperature supplied by the air-conditioning system, the air-conditioning system comprising:

interior temperature control means for controlling the temperature of the air flow in an interior temperature control mode as a function of a deviation of an interior temperature of the passenger compartment of the vehicle determined by an interior temperature sensor from a given desired temperature, blow-out temperature control means for controlling the temperature of the air flow in a blow-out temperature control mode as a function of a deviation of a blow-out temperature of air provided by the air-conditioning system and a desired temperature, and switching means for detecting a condition of an opened vehicle body opening and for switching the air-conditioning system from the interior temperature control mode to blow-out temperature control mode wherein the temperature of the air flow is controlled as a function of a deviation of a blow-out temperature of air provided by the air-conditioning system and a desired temperature.

2. An air-conditioning system according to claim 1, wherein the switching means is a manually operable switch.

3. An air-conditioning system according to claim 1, wherein the switching means is a limit switch operated by a component which closes the vehicle body opening.

4. An air-conditioning system according to claim 1, further comprising at least one of a fan with a controllable rotational speed stage, a vehicle speedometer, an outside temperature sensor and a blow-out temperature sensor, wherein the switching means, from the blow-out temperature and at least one of a value of the rotational-speed stage, a vehicle speed and an outside temperature determines a limit value for a time variation of a temperature deviation of the interior temperature from the desired temperature, and compares the limit value with an actual time variation of the temperature deviation of the interior temperature from the desired temperature and, when the actual time variation is less than a minimum desired variation, causes the air-conditioning system to switch from the interior temperature control mode to blow-out temperature control mode.

5. An air-conditioning system according to claim 4, wherein the comparison takes place only at blow-out temperatures in an upper temperature range.

6. An air-conditioning system according to claim 4, wherein a switching-over from the interior temperature control mode to the blow-out temperature control mode takes place only if the time variation of the temperature deviation falls below the minimum desired variation for at least a given time period.

7. An air-conditioning system according to claim 1, wherein during the blow-out temperature control mode, a desired value for the blow-out temperature is increased by a fixed amount.

8. An air-conditioning system according to claim 1, wherein the interior temperature, measured by an interior temperature sensor, is monitored with respect to a time variation thereof, and the air-condition system is switched over from interior temperature control mode to the blow-out temperature control mode, if the measured interior temperature is subjected to large value fluctuations over time.

9. An air-conditioning system according to claim 8, wherein the switching-over from the interior temperature control mode to the blow-out control mode takes place only at blow-out temperatures in an upper temperature range.

10. An air-conditioning system according to claim 8, wherein the switching-over will take place only when the large value fluctuations with respect to time of the measured interior temperature occur during at least a given time period.

* * * * *